Nov. 5, 1940.                H. E. BALSIGER                2,220,470
                    PRESSURE REGULATOR FOR SIZING DEVICES
                    Filed March 13, 1936            2 Sheets-Sheet 1
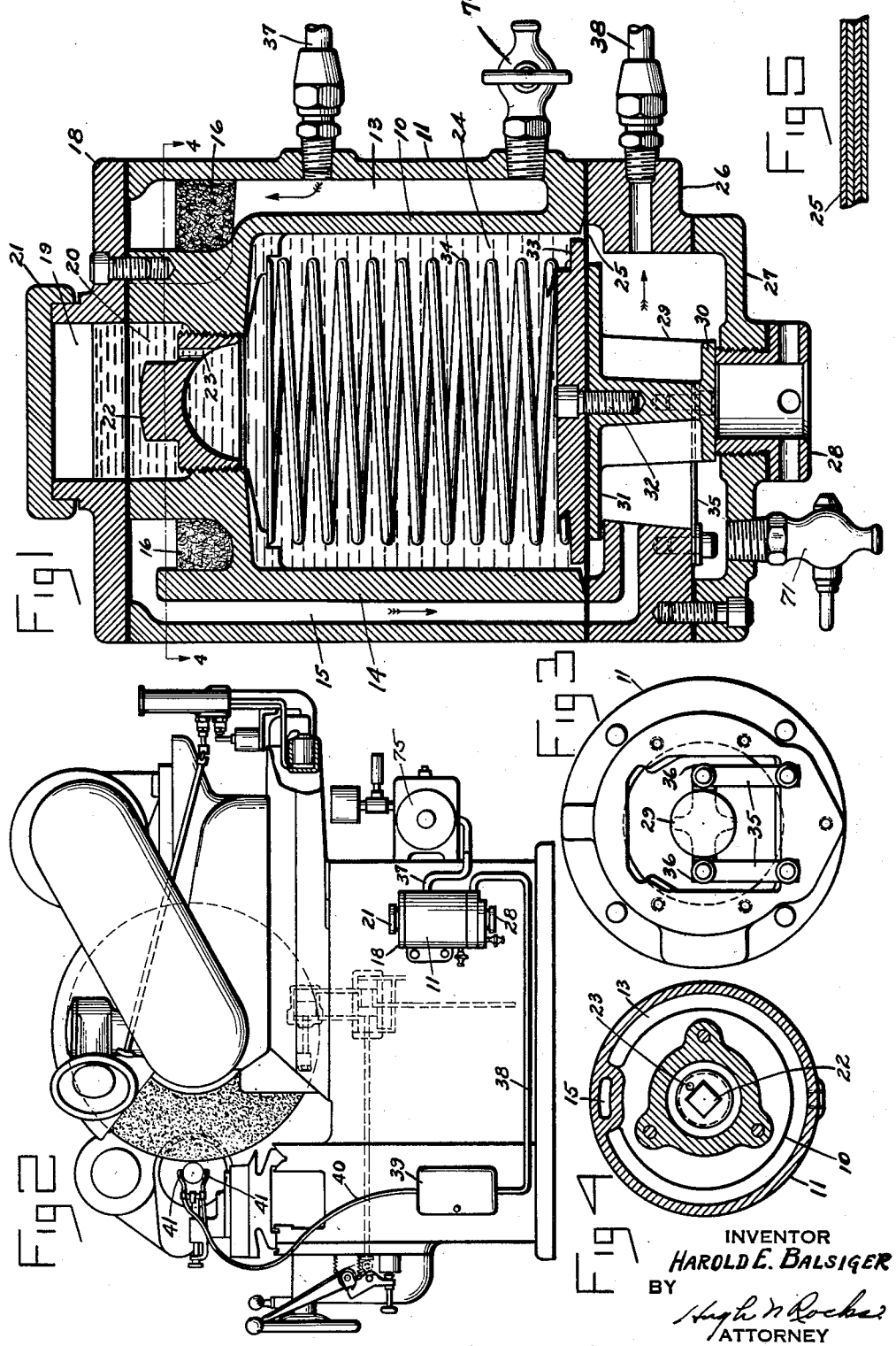
INVENTOR
HAROLD E. BALSIGER
BY
                    ATTORNEY Nov. 5, 1940.  H. E. BALSIGER  2,220,470
PRESSURE REGULATOR FOR SIZING DEVICES
Filed March 13, 1936  2 Sheets-Sheet 2
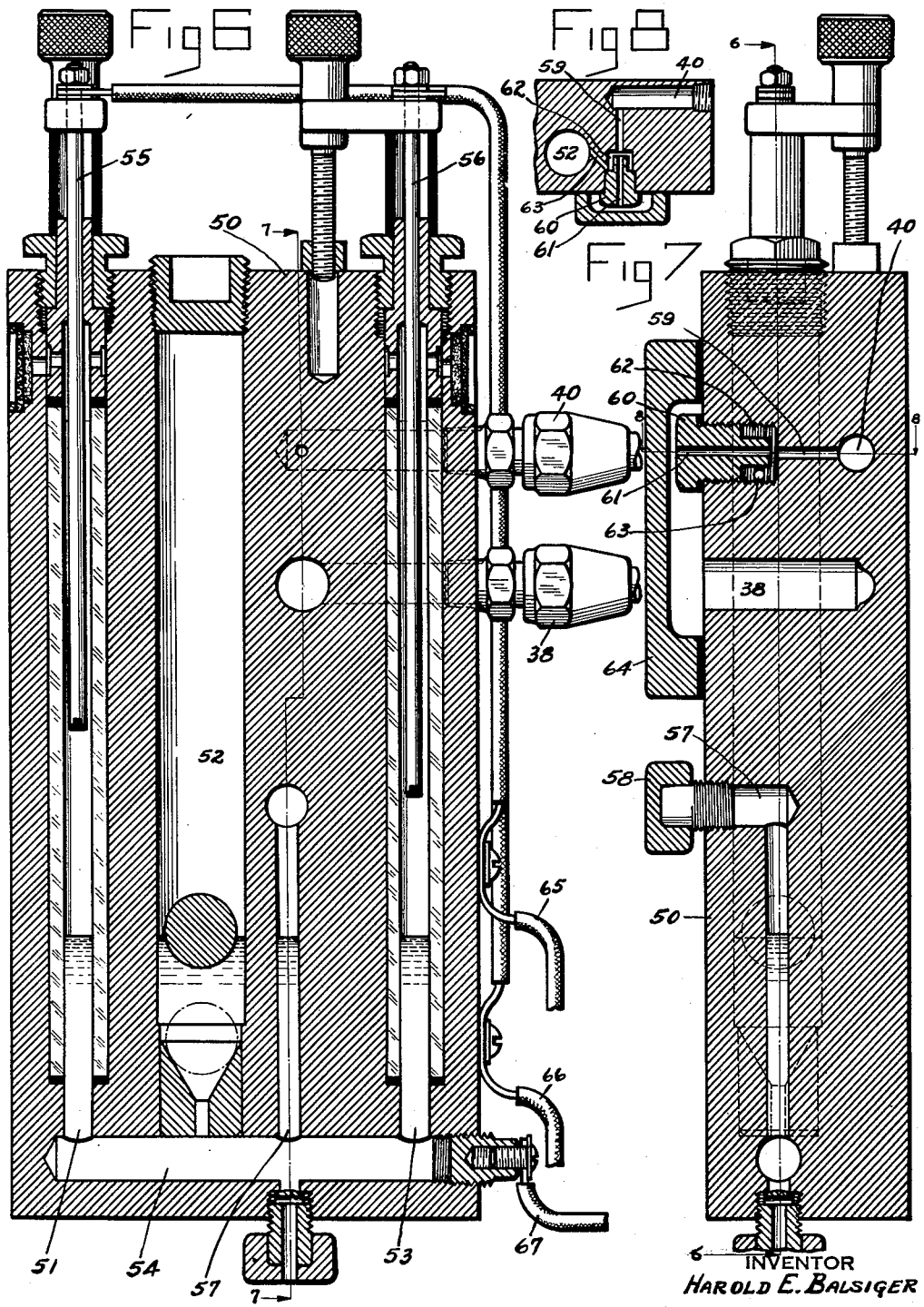
INVENTOR
HAROLD E. BALSIGER
BY
ATTORNEY Patented Nov. 5, 1940

2,220,470

UNITED STATES PATENT OFFICE 2,220,470

PRESSURE REGULATOR FOR SIZING DEVICES

Harold E. Balsiger, Waynesboro, Pa., assignor to Landis Tool Company, Waynesboro, Pa., a corporation of Pennsylvania Application March 13, 1936, Serial No. 68,776

1 Claim. (Cl. 137—53)

My invention relates to regulating devices for fluid under pressure and particularly for pneumatic size control mechanisms and it is an object of the same to provide means whereby the pressure of the air supply may be maintained constant within very narrow limits.

A further object is to provide a diaphragm for said pressure regulator constructed to obtain maximum wearing qualities.

A further object is to provide resilient valve guides for the valve portion of said pressure regulator.

A further object is to combine in a single device means for controlling fluctuations in fluid under pressure within predetermined limits.

In the drawings Figure 1 is a sectional elevation of my pressure regulating device.

Figure 2 is an end view of a grinding machine showing the method of mounting the pressure regulator thereon.

Figure 3 is an inverted plan view showing the resilient valve guides.

Figure 4 is a section taken on the line 4—4 of Figure 1.

Figure 5 is a cross section of the diaphragm showing the construction thereof.

Figure 6 is a sectional front elevation of my improved pressure indicating device.

Figure 7 is a sectional end elevation along the line 7—7 of Figure 6.

Figure 8 is a partial sectional plan view showing the construction of the Venturi arrangement.

Previous devices used for the purpose of regulating low pressure fluid supplies had the disadvantage of not being capable of regulating the pressure within close enough limits to satisfy the requirements of accuracy demanded. In order to satisfy these requirements it was necessary to provide a valve which would respond to very small variations in pressure. Such a valve must necessarily be light in weight and must open and close with a minimum of friction. The question of weight could be solved by using the lightest practical material and in designing the parts to use a minimum of such material. The question of friction was met by making the diaphragm of flexible, non-resilient material, using a flat valve seat to eliminate any friction from rubbing or sticky surfaces, and guiding the valve to its seat by resilient guide strips which are attached to the valve in the manner of a cantilever.

Under a 20% change in volume of air supplied to the regulator, the pressure will change less than one-thousandth of an ounce per square inch. With the best previous type of regulation which could be obtained, even after new parts were made of special materials, the variation in pressure was one-eighth of an ounce per square inch or one-hundred-twenty-five times less accurate than applicant's device My device consists of an inner shell 10 and an outer shell 11 cast integrally. The space 13 between said shells extends around the entire inner shell except for a portion 14 which forms a connection between the shells and thru which a passage 15 extends to the bottom thereof. Said passage is open at the top to space 13. A filtering substance 16 fills the upper portion of the space between said shells. Both shells are open at the top. A cover 18 secured to said inner shell forms an air tight closure for the space between the shells. Said cover has an opening 19 therein which coincides with the opening 20 in the inner shell. A removable cover or lid 21 closes said opening 19. The lower portion of hole 20 in shell 10 is threaded to receive a plug 22. A small hole 23 is drilled thru said plug. Space 13 is closed off at the bottom except for the passage 15. Inside the inner shell 10 is formed a chamber 24. Across the lower end of said chamber is secured a diaphragm 25 of flexible non-resilient material. Said diaphragm is held in place by a ring like member 26 attached to the lower side of said shells. The passage 15 is continued thru said member 26 and extends radially toward the inside thereof. A lower cover portion 27 is secured to said ring. A valve seat portion 28 is inserted in said cover. As shown in Figure 1, the diameter, and hence the area of the opening of said valve seat is relatively large considering the volume of air to be handled. The reason for this is that excess air must be removed quickly so as not to affect the pressure at the outlet 38. The minute fluctuations in the air supply to which the diaphragm must re-act will produce a correspondingly minute movement of the diaphragm and of the valve 25. This minute movement must produce a change in the opening between the valve and the valve seat to provide a free outlet for the excess air. A valve 29 has a portion 30 adapted to engage said seat and a larger portion 31 secured to the diaphragm 25 by means of a screw 32 in a disk 33 on the opposite side of said diaphragm. Said screw passes thru said diaphragm into a threaded hole in valve 29. Said valve is held against the seat by a spring 34 inside shell 10. One end of said spring bears against a shoulder in the upper portion of the inner shell, the other end against said disk 33. Movement of the valve 29 is guided by a pair of flat springs 35 as well as by diaphragm 25, thus insuring a substantially straight line motion of said valve since each of said elements prevents lateral movement of the valve and permits axial movement only. Said springs are arranged in substantially parallel relation in the same horizontal plane. One end of each spring is secured to lugs 36 on valve 29. The other end of each of said springs is attached to the ring like element 26. Since valve 29 rests on a flat seat and is actuated and guided by the diaphragm 25, and the springs 35, respectively, and since the only friction is the internal friction of the material of the diaphragm, guide strips, and spring, it is obvious that a relatively small impulse will actuate same. Chamber 24 is filled with a liquid, preferably oil to a level just below the cover 21. Air or other fluid under pressure of pump 75 enters space 13 from line 37, passes thru the filtering substance 16, then thru passage 15 to the opening formed by ring 26. From here it passes thru line 38 to the sizing device. A slight fluctuation in the air pressure acts against the diaphragm to lift valve 29 off its seat and thus release the excess pressure. This movement of the valve is dampened by the fluid in shell 10, the movement of said fluid being restricted by the size of the hole 23. A valve 70 is inserted in said outer casing 11, in a position near the bottom of the space 13. Another valve 71 is mounted in the chamber surrounding the valve 29. When said valves are open the fluid under pressure which passes into space 13 is effective to remove any dirt which has collected therein.

Air under pressure is supplied to my device from line 37 through a filtering medium 16 and from there through passage 15 to a chamber in the lower portion of the device in which the valve 29 is mounted. As soon as air reaches this chamber the pressure is effective through diaphragm 25 to lift said valve a slight amount which is determined by the force of spring 34. If for any reason the volume of air passing through my device increases momentarily the valve will be opened wider to permit the escape of any excess over the normal volume. If the supply of air decreases momentarily the valve will be permitted to move toward a closed position whereby to prevent a drop in pressure. After passing through the valve chamber the air is discharged through a line 38 which directs it to any device connected thereto which requires a uniform air supply within very narrow limits.

The pressure switch disclosed in Figures 6, 7 and 8 is a more compact unit than was formerly used in devices of this kind. It consists of a block 50 in which are drilled three vertical holes 51, 52 and 53. These holes are connected by a horizontal passage 54 near the lower end of the block. In each of the holes 51 and 53 are mounted conductors 55 and 56 respectively, which are adjustable lengthwise thereof. The lower portion of the holes 51, 52 and 53 and all of the passage 54 contain a body of electrically conductive fluid preferably mercury. This fluid is introduced thru an opening 57. A cap 58 is provided to close said opening after the fluid has been added.

Air under pressure enters block 50 thru passage 38 and leaves by passage 40. Air reaches passage 40 thru a restricted passage 59. Said passage 59 is connected to a larger opening in block 50 into which is inserted a plug 60. Said plug has a restricted passage 61. The inner end of said plug does not seat against the bottom of the hole and is of slightly smaller diameter so that there is a small space between the ends of passages 59 and 61 and a chamber 62 formed around the reduced portion of said plug. Another small passage 63 connects said chamber with bore 52. A cap 64 covers the opening to passage 38 and also plug 60 so as to provide a passage for air between these points.

Contacts 55 and 56 are connected to lines 65 and 66. A third contact 67 is inserted in passage 54 and is a common line for the other two.

It will be obvious to those skilled in the art that various changes may be made in my device without departing from the spirit of the invention, and I, therefore, do not limit myself to what is shown in the drawings and described in the specification, but only as set forth in the appended claim.

Having thus fully described my said invention, what I claim as new and desire to secure by Letters Patent, is:

A regulator for maintaining a flow of fluid through a line at a predetermined pressure comprising a casing having inlet and outlet passages therein, said casing having an escape passage at one side thereof and a valve seat associated with said escape passage, a nonresilient diaphragm at the opposite side of said casing from the escape passage, a valve fixed to said diaphragm and adapted to move toward and from said seat, a spring acting on the diaphragm in opposition to the pressure in the casing for moving said valve toward the seat, resilient members attached to the casing at one side of the escape passage and connected to the valve and cooperating with said diaphragm in guiding said valve in its movements relative to said seat, said spring being adjusted so that the valve moves out of contact with the seat when the fluid pressure on the outlet reaches the desired predetermined degree, said valve seat being large relative to the inlet volume whereby valve movements of a few thousandths of an inch in response to slight fluctuations in volume in the fluid supply will produce relatively large changes in the area of the opening to the escape passage and quickly vary the volume released and thereby maintain the pressure on the outlet at said predetermined degree.

HAROLD E. BALSIGER.